(12) United States Patent
Shammoh

(10) Patent No.: US 8,350,889 B1
(45) Date of Patent: Jan. 8, 2013

(54) INTEGRATED COMPUTER, TELEVISION, AND TELEPHONE

(76) Inventor: Ali A. A. J. Shammoh, Al-Adan (KW)

( * ) Notice: Subject to any disclaimer, the term of this patent is extended or adjusted under 35 U.S.C. 154(b) by 0 days.

(21) Appl. No.: 13/536,863

(22) Filed: Jun. 28, 2012

(51) Int. Cl.
*H04N 7/14* (2006.01)

(52) U.S. Cl. ............ 348/14.02; 348/14.01; 379/110.01; 725/106

(58) Field of Classification Search .... 348/14.01–14.16; 379/90.01, 110.01, 100.17; 725/110, 109, 725/134, 5; 455/3.06, 344, 345, 60.01, 557, 455/41.2, 414.4, 419; 345/173, 156
See application file for complete search history.

(56) References Cited

U.S. PATENT DOCUMENTS

| | | | |
|---|---|---|---|
| 6,359,636 B1 * | 3/2002 | Schindler et al. | 715/846 |
| 6,571,392 B1 * | 5/2003 | Zigmond et al. | 725/110 |
| 7,124,374 B1 * | 10/2006 | Haken | 715/859 |
| 7,668,120 B2 | 2/2010 | Kolar | |
| 7,769,342 B2 | 8/2010 | Tabe | |
| 7,996,040 B1 | 8/2011 | Timm | |
| 8,077,158 B2 | 12/2011 | Shneidman | |
| 2001/0027560 A1 | 10/2001 | Simon | |
| 2010/0073455 A1 * | 3/2010 | Iwabuchi et al. | 348/14.04 |

OTHER PUBLICATIONS 40 inch NX720 Series Bravia Full HD 3D *1 TV http://www.sony-asia.com/product/kcl-40nx720 retrieved from Internet on Mar. 19, 2012.

* cited by examiner

*Primary Examiner* — Melur Ramakrishnaiah
(74) *Attorney, Agent, or Firm* — Richard C. Litman

(57) ABSTRACT

The integrated computer, television and telephone integrates several entertainment devices, such as a personal computer, TV, Internet Router, USB Router, Satellite receiver, home telephone, and a digital camera with their components, into one device. The integrated apparatus includes three cables extending from the housing. The three cables are used to provide power, satellite reception, and a home phone line. The apparatus includes document printing using the built-in wireless capability. An Internet router allows Internet communication of local area devices. A digital camera is included to allow video and still photography, as well as video conferencing. In case a home phone line is not available, it is possible to use wireless connections, such as HSDPA or GPRS, provided by mobile telecommunication companies.

7 Claims, 4 Drawing Sheets

INTEGRATED COMPUTER, TELEVISION, AND TELEPHONE

BACKGROUND OF THE INVENTION

1. Field of the Invention

The present invention relates to digital electronic entertainment centers, and particularly to an integrated computer, television, and telephone.

2. Description of the Related Art

With the modern communications and entertainment apparatuses available today, users desire to keep in touch with friends and family by making and receiving phone calls from their television. These users want Internet and TV together with phone capability, i.e., they want a true all-in-one entertainment centre that allows access to TV channels, websites, and telephone on a single multimedia device.

Thus, an integrated computer, television, and telephone solving the aforementioned problems is desired.

SUMMARY OF THE INVENTION

The integrated computer, television, and telephone integrates several entertainment devices, such as a personal computer, TV, Internet Router, USB Router, Satellite receiver, home telephone, and a digital camera with their components, into one device. The integrated apparatus includes three cables extending from the housing. The three cables are used to provide power, satellite reception, and a home phone line. It is possible to use the television and the computer component as a PIP option (Picture In Picture). This will enable the user to view his/her favorite TV channel and a website or a computer program, such as a game, at the same time. Also the integrated telephone can be seamlessly used too. The computer component of the system enables a user to print documents or pictures using the built-in wireless capability. It is also possible to copy/move and manage files using the integrated USB router attached to the device. Due to the fact that the device also incorporates an Internet router, it is possible that any device equipped with a wireless LAN capability can connect to the device's shared Internet service and be used as an Internet router. The device also incorporates a digital camera (webcam) that enables the user to take snapshots and video clips, as well as video conferencing with friends and family. In case a home phone line is not available, it is possible to use wireless connections, such as HSDPA or GPRS, provided by the mobile telecommunication companies.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
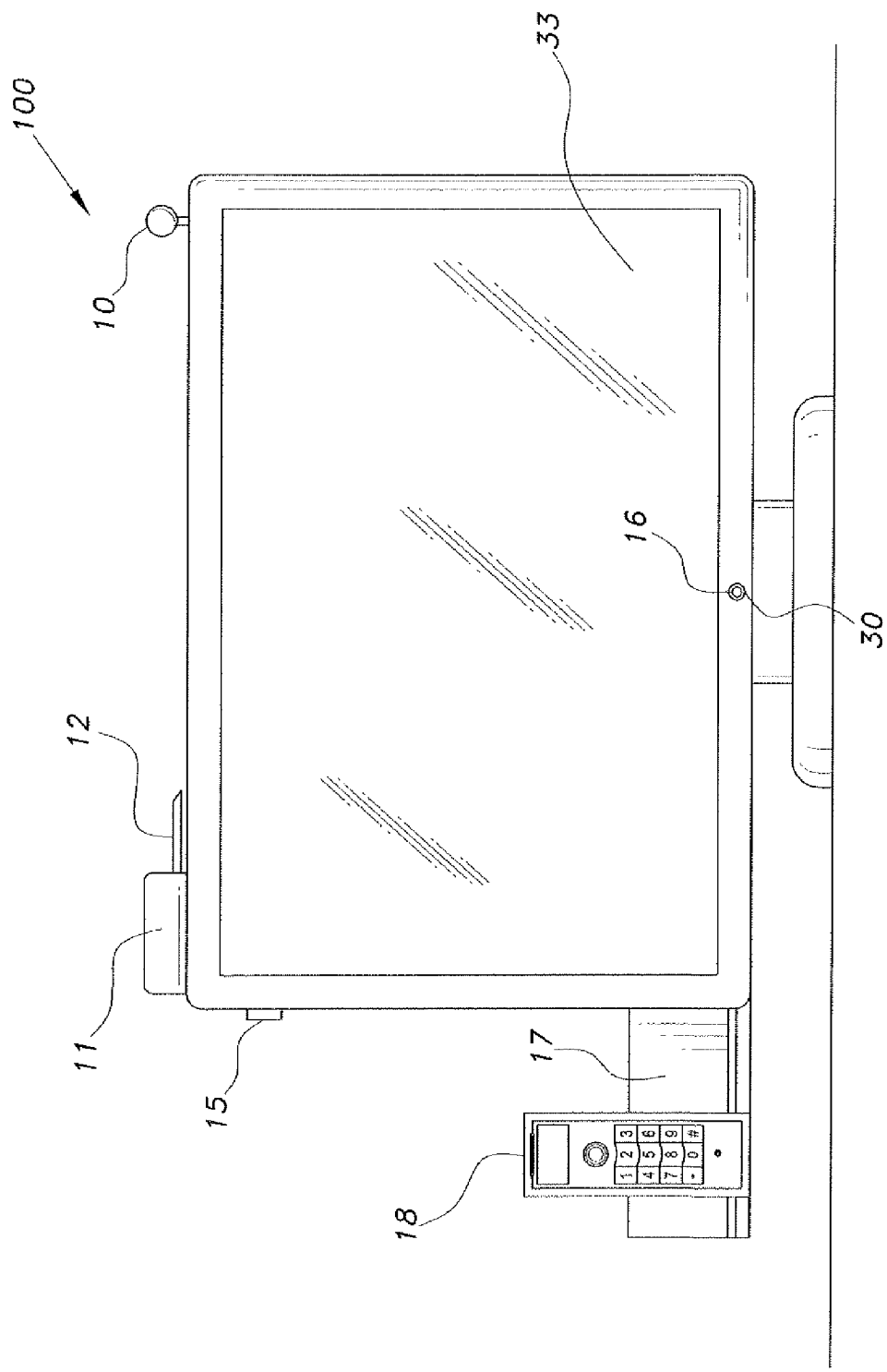
FIG. 1 is a front view of an integrated computer, television, and telephone according to the present invention.
Figure 2:
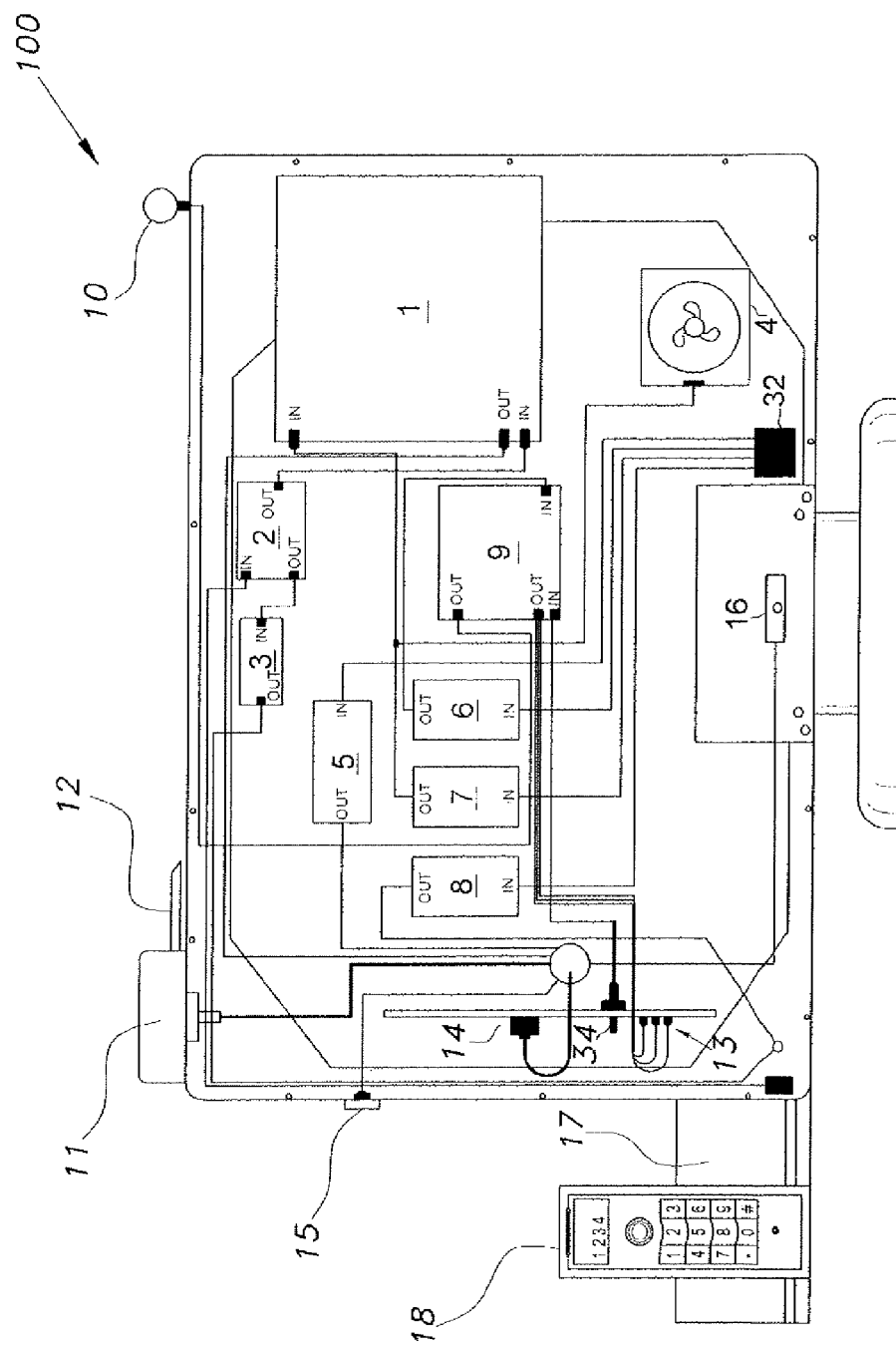
FIG. 2 is a schematic front view of the integrated computer, television, and telephone according to the present invention, shown with the screen removed to show the layout and interconnection between modules of the unit.
Figure 3:
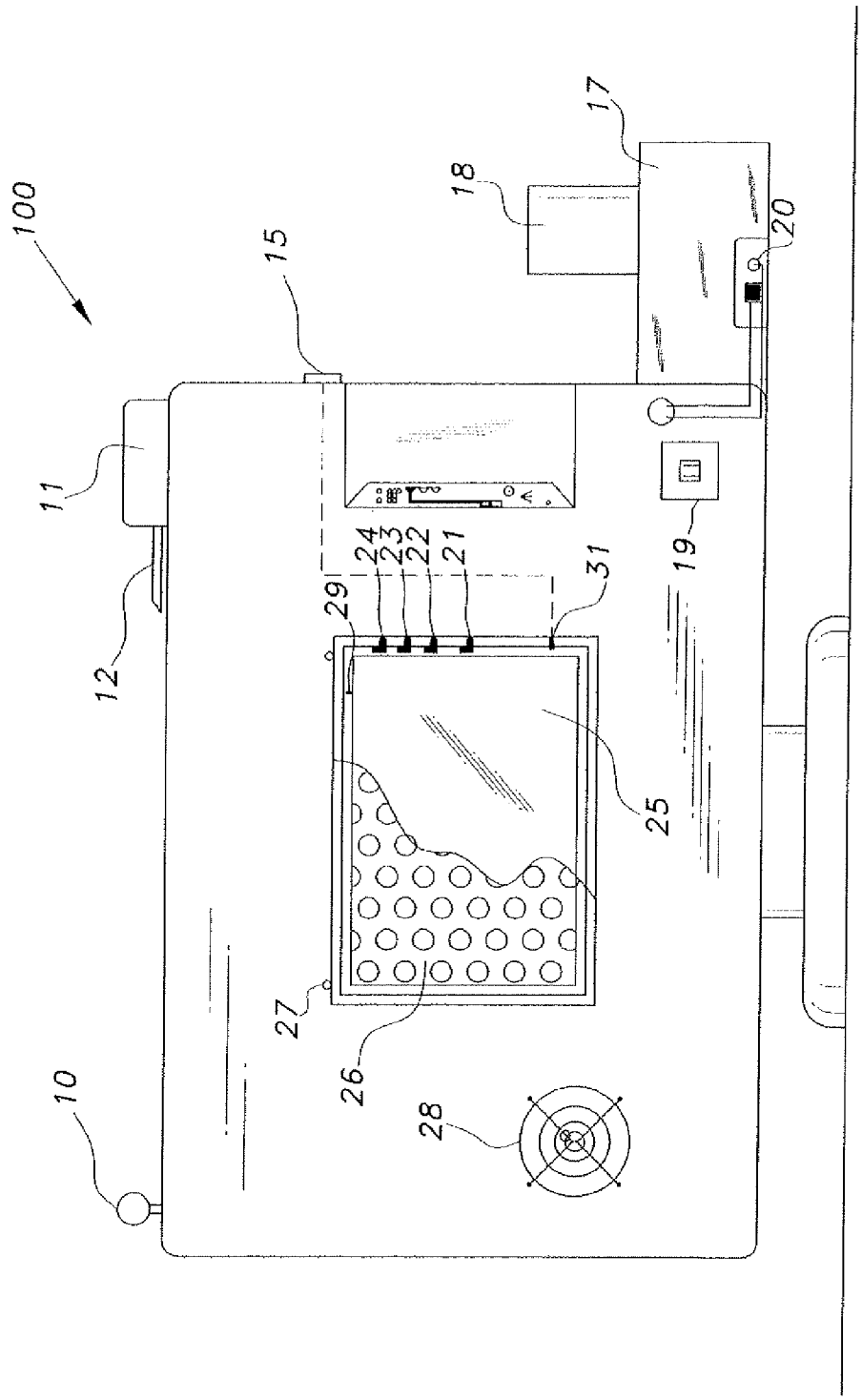
FIG. 3 is a rear view of the integrated computer television telephone according to the present invention, shown with the housing partially broken away to show details thereof.
Figure 4:
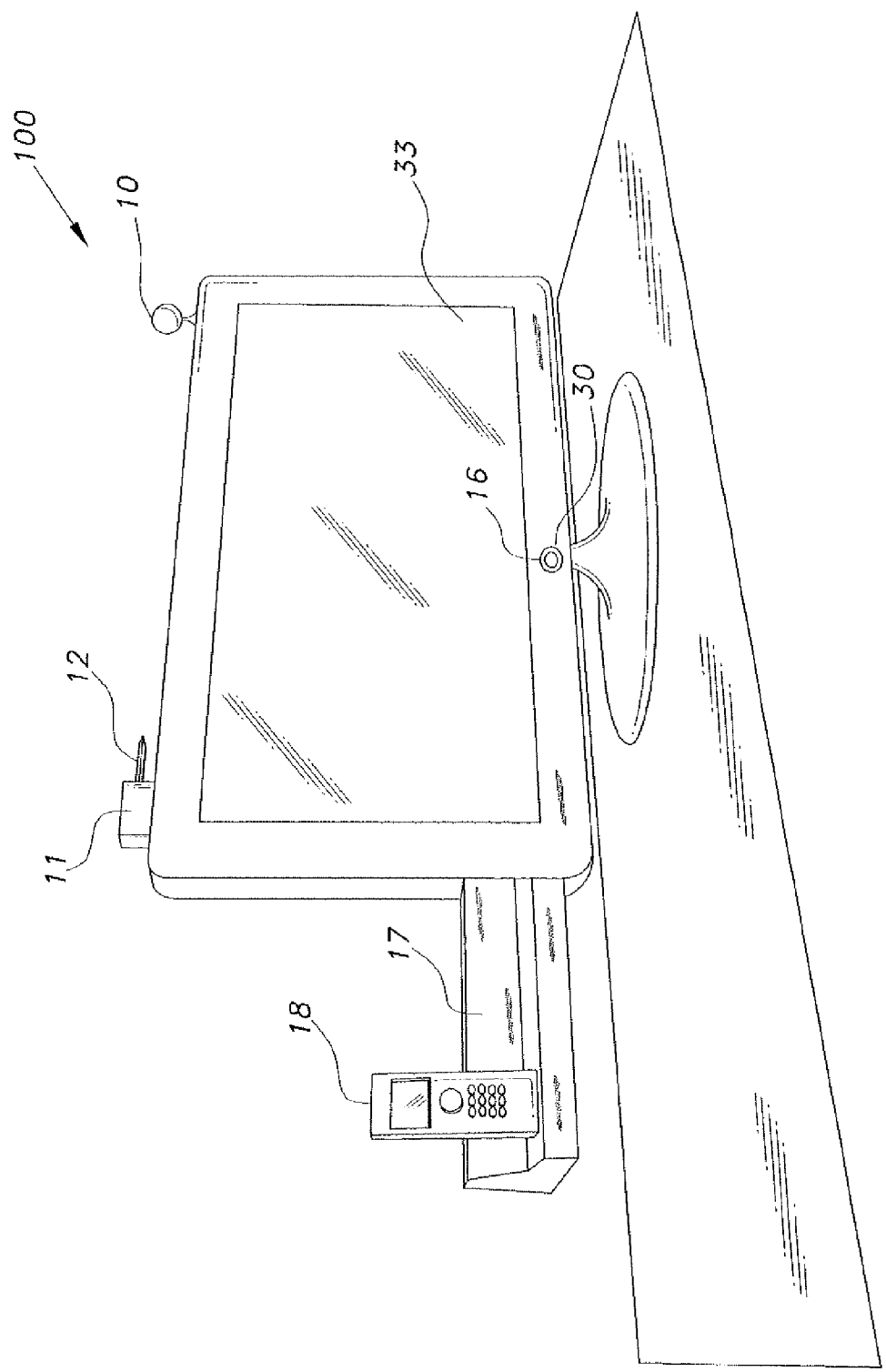
FIG. 4 is an environmental perspective view of an alternative embodiment of an integrated computer television telephone according to the present invention.

As shown in FIGS. 1-3, the integrated computer, television, and telephone apparatus 100 integrates several entertainment devices (such as a personal computer, TV, Internet Router, USB Router, Satellite receiver, home telephone, and a digital camera with their components) into a single device. FIG. 4 shows a similar integrated computer, television and telephone apparatus, but having a different pedestal mount. The integrated apparatus 100 includes three cables extending from the housing. The three cables are used to provide power, satellite reception, and a home phone line. The apparatus includes document printing using built-in wireless capability. The Internet router allows Internet communication of local area devices.

A 1.3 MP digital camera 16 is included to allow video and still photography, as well as video conferencing. In case a home phone line is not available, it is possible to use wireless connections, such as HSDPA or GPRS, provided by the mobile telecommunication companies.

The apparatus 100 has a 32" screen size, and allows you to view video, conduct text and voice conversations, capture images, printing, download, upload, and delete files, etc. The apparatus 100 basically performs all the functions of a modem personal computer.

The apparatus 100 uses Microsoft Windows Vista® or later operating system with PC specifications, such as 4 GB RAM, 320 GB Hard drive, USB ports, and an integrated webcam 16 for video conferencing and image capturing. The integrated apparatus 100 can connect to the Internet using landlines, LAN and WLAN, and T networks, just like any computer. Moreover, the apparatus 100 can provide other Internet-ready devices with Internet service due to the built-in, integrated wireless Internet router 1.

Additionally, the device 100 incorporates a fully functional satellite receiver 9. The apparatus 100 can be used simultaneously by three individuals because it has a screen splitter that splits the screen into a PC section, a TV satellite viewing section, and an integrated telephone conversation section. The device 100 may be mounted on a wall, placed over a table, and due to its screen size can be watched from a distance, just like any 32" LCD screen. All inputs (controlling devices such as keyboard, mouse, remote control, etc.) are done in a wireless fashion.

As shown in FIG. 1, the integrated apparatus 100 includes a satellite receiver's remote control sensor 10 mounted on the housing on a top right portion (as viewed from the front) of the integrated apparatus 100. On a top left portion of the housing is a USB router 11, and a mouse and keyboard wireless sensor 12. The top left vertical side of the housing includes a motherboard power switch 15. The lower face of the housing includes a mounting point throughbore 30 in which a web camera 16 is centrally mounted. A home telephone base unit 17 is affixed to a lower left portion of the housing by an elongate metal plate. A home portable telephone 18 attaches to the base unit 17. An LCD screen 33 is mounted in the housing. The screen 33 may be used for viewing television, as a computer screen, as a videophone screen, etc.

Component connectivity is most clearly shown in FIGS. 2 and 3. A splitter 2 has a single input IN and two outputs OUT. The input IN is connected to a main phone line via an RJ11 telephone jack 19 at the back of the housing (as shown in FIG. 3). A first of the two OUTs is connected to the input of a filter 3. The second output of the splitter 2 is connected to one of two inputs of the Internet router 1. The second input of Internet router 1 accepts power from an Internet ADSL router 12-volt DC power supply 7, as does a cooling fan unit 4.

The filter unit 3 filters out the ADSL signal and has an output connected to the home telephone base unit 17. The ADSL signal is also routed to an ADSL port 23 connected with the router 1 by a LAN cable to feed the computer 25, which may be a personal computer (PC), with an Internet connection.

A receiver 9 is dedicated to the reception of satellite channels (Arab-SAT, Nile-SAT, and Europe) and has a first input for power from a satellite receiver power supply unit 6, which takes a 240-V AC input and outputs 12-V DC. A second input of the receiver 9 accepts signals from a satellite cable input connector 34. The receiver 9 has a first output connected to the satellite receiver remote control sensor 10 and a second output connected via cable to audio-video input AV1 13 of the TV 33. The base unit 17 of portable home telephone 18 has a bracket with two input ports. The first input port 20 of the base unit 17 is for power (IN 240-V AC, OUT 7-V DC) from a portable home telephone power supply 8, which supplies an output of 7-volts DC from an input of 240-volts AC. The second input port of the base unit 17 accepts the home phone line from the filter 3. Power supplies 5, 6, 7, and 8 are fed from a 240-volt AC mains receptacle 32.

The cooling fan 4 is mounted on the back of the housing and a protective mesh cover 28 protects users from the blades of cooling fan 4.

The USB Router 11 has four input ports, one of which is connected to the PC 25 by means of a USB cable connector 22. It is possible to copy/move and manage files using the integrated USB router 11 attached to the PC 25. The PC power switch 15 is connected to a PC power cable 31. The digital camera, i.e., the webcam 16, is connected to a USB connection 21 of the personal computer 25. An HDMI cable connection 14 from the LCD TV is connected to the PC 25 via a PC HDMI connector 24. The protective metal mesh 28 for the cooling fan 4 is affixed behind the housing by four screws, the mesh 28 having a diameter of three inches. The PC 25 is integrated and programmed, and has 4 GB RAM and 320 GB HDD, Intel Core 2.0 Duo processor, Microsoft VISTA operating system. The PC 25 is attached to the integrated unit 100 behind the housing.

A power supply unit 5 having input of 240-volts AC and an output of 19-volts DC supplies the PC 25 with 19-volts DC via a power cable connector port 29. A metal cover 26 fits over the PC 25 to protect the PC 25 and is fixed by four mounting points 27 behind the housing. Preferably the protective cover 26 has a length of 42 cm, a width of 30 cm, and a depth of 4 cm, and has many perforated openings for cooling and weight reduction. The metal cover is fixed by four screws at the four mounting points 27.

The integrated computer, television, and telephone may be manufactured as an integrated unit, or may be made as an aftermarket product by combining separately manufactured modules.

It is to be understood that the present invention is not limited to the embodiments described above, but encompasses any and all embodiments within the scope of the following claims.

I claim:

1. An integrated computer, television and telephone, comprising:
   a housing;
   a television disposed in the housing, the television having a screen with two way split picture capability, at least one HDMI input, and at least one A/V input;
   an elongate attachment member extending from a side of the housing;
   a cordless telephone base unit attached via the elongate attachment member to the housing, the cordless telephone base unit being operationally connected to the at least one A/V input of the television;
   a CPU with motherboard disposed on the back of the housing, the motherboard having a WAN input and a LAN wireless transceiver for WAN and LAN connectivity, the CPU with motherboard being fully operationally integrated with functionality of the television;
   a computer operating system loaded in and operable with the CPU and motherboard;
   a fully functional satellite receiver disposed inside and operationally connected to the television via the HDMI input of the television;
   a main RJ11 telephone jack attached to the housing, the main RJ11 telephone jack accepting a main telephone plug from a main telephone line, the main telephone line bringing in voice telephonic signals and high frequency ADSL signals;
   an ADSL router disposed inside the housing;
   a DSL filter-splitter connected to a signal line extending inside the housing from the main RJ11 telephone jack, the DSL filter-splitter low pass filtering the DSL signal from a first branch of the signal line and freely passing the DSL signal through a second branch of the signal line, the first branch of the signal line being routed to the cordless telephone attached to the television set, the second branch of the signal line being routed to an input of the ADSL router, the ADSL router having an output connected to the WAN input of the CPU with motherboard;
   means for splitting the screen two-ways in order to utilize the two way picture capability of the television, the two-way screen splitting means dividing the screen of the television set into a PC user section, and a TV satellite viewing section, the integrated telephone remaining available for telephone conversation use even when the PC user section and the TV satellite viewing section are active;
   means for accepting display output of the CPU with motherboard for display of PC data on the PC user section of the television screen;
   a remote control sensor for the satellite receiver, the remote control sensor being mounted on the housing;
   a cooling fan mounted in the housing;
   a USB router mounted atop the housing;
   a mouse and keyboard wireless sensor attached to and operationally connected to the USB router, the USB router exchanging mouse and keyboard signals with the CPU with motherboard;
   a 1.3 MP digital camera attached to a central lower portion of the housing, the 1.3 MP digital camera being connected to the CPU with motherboard via the USB router;
   means for powering the ADSL router;
   means for powering the cooling fan;

means for powering the CPU with motherboard, the means for powering the CPU with motherboard including a motherboard on/off power switch disposed on the housing;

means for powering the cordless telephone base unit;

means for powering the fully functional satellite receiver; and means for powering the television.

2. The integrated computer, television, and telephone according to claim 1, wherein said television screen is a 32-inch screen.

3. The integrated computer, television, and telephone according to claim 1, wherein said two way picture capability includes at least one picture-in-picture display.

4. The integrated computer, television, and telephone according to claim 1, further comprising a mesh cover attached to the back of said housing and disposed over said CPU with motherboard, said mesh cover including perforated holes, thereby providing a protective, ventilated housing for said CPU with motherboard.

5. The integrated computer, television, and telephone according to claim 1, further comprising a mesh cover attached to the back of said housing and disposed over said cooling fan.

6. The integrated computer, television and telephone according to claim 1, wherein said television screen is an LCD screen.

7. The integrated computer, television, and telephone according to claim 1, wherein said satellite receiver comprises means for receiving Arab-SAT, Nile-SAT, and European satellite transmissions.

* * * * *